United States Patent Office 2,922,769
Patented Jan. 26, 1960

2,922,769

COATING COMPOSITIONS AND LIQUID VEHICLES CONTAINING ESTERS OF POLYMERIZED FATTY ACIDS AND DRIERS

William P. Cody, Lombard, Ill., assignor, by mesne assignments, to Reichhold Chemicals, Inc., White Plains, N.Y., a corporation of Delaware No Drawing. Application February 16, 1955
Serial No. 488,721

2 Claims. (Cl. 260—22)

The present invention relates to the manufacture of coating compositions which are pigmented to form paints and enamels, and particularly to liquid vehicles and components thereof for use in such coating compositions.

In the use of coating compositions, the working quality for application by spraying, brushing or rolling is very important. The composition should brush easily with a minimum of drag, yet it should exhibit a minimum tendency to splatter or splash and be free from the tendency to run after application, or to sag or bead. The composition after application should "body" quickly, yet it should not set to the point of immiscibility with like composition subsequently applied as the work advances, as in working over and back to the edges or areas just previously coated.

In addition, such compositions must have good shelf life in cans, and to minimize settling of the pigment in the can, the composition should be suitably viscous, yet this viscosity should not operate against its application qualities as taken from the can or as thinned for application. Some paint compositions are thixotropic, that is, thick or viscous on standing undisturbed, yet subject to lowering of viscosity by disturbance, as by stirring, or by applying with a brush or roller. These are desirable qualities and are difficult of attainment and control in degree.

The present invention provides a new ingredient for a liquid vehicle, and new vehicles, into which pigments may be milled for producing paints and enamels. The new vehicle includes a new ingredient which imparts new and improved qualities to coating compositions containing it.

It is the general object of the invention to improve the working qualities of certain coating compositions.

It is a particular object to provide a mixed liquid for coating compositions and a new ingredient therefor which is a substance to be combined in varying proportions with other ingredients, in order to control the properties of a coating composition to a desired degree.

It is also a particular object to provide for more economically milling of pigments into liquid vehicles for certain coating compositions.

It is a particular object to provide thixotropic coating compositions.

Various other and ancillary objects and advantages will become apparent from the following description and explanation.

Coating compositions are compounded to function by either one or both of two drying mechanisms. When a volatile solvent is present, it evaporates after application of the composition, thereby effecting an initial bodying of the coat controlled by the volatility of the volatile vehicle. Compositions lacking in volatile solvent are designed to body by oxidation, as by the effect of air on the vehicle to oxidize a liquid form to a solid dry film. Such drying vehicles change from liquid to viscous form, then to gel form, then to a tacky solid, and then to a dry solid. Many common drying vehicles for pigments contain components which are known as "semi-drying," i.e., lacking the property of being oxidized to hard films. It is customary to add certain catalysts to hasten the drying by oxidation of drying and semi-drying ingredients, and such catalysts are known as driers. They vary in number and widely in character, being largely metallic salts of organic acids soluble in the composition in which they function.

There is a family of liquid compositions having semi-drying properties which family is herein referred to for convenience as dimerized fatty acids, better described in U.S. Patent No. 2,482,761, to Goebel. According to said patent, the fatty acids of oils such as soya, linseed, and cottonseed, which predominate in 18-carbon acids, are dimerized to form a predominant quantity of dimer and about 10% or less of trimer. The dimerized fatty acid of said patent, referred to herein, is available on the market as "Empol 1022," a trade-marked product of Emery Industries, Inc., Cincinnati, Ohio, further characterized as polymerized fatty acid.

The present invention condenses such dimerized fatty acid by an esterification reaction essentially with a dihydric aliphatic alcohol, as for example, ethylene glycol, propylene glycol, and 1,4-butylene glycol. Trihydric alcohols, such as glycerine and trimethylolethane, are not suitable when used alone as the condensation product is highly gelatinous and so insoluble as to be unsuitable as a paint vehicle ingredient. However, small amounts may be used with the dihydric alcohol to impart a desired higher viscosity.

The condensation is incomplete with respect to forming a complete ester, and is carried out to yield a condensation product having an acid number upwardly from 2, preferably in the range from 2 to 30. The condensation product so obtained is hereinafter referred to as "polyester."

I have discovered that the presence of such a polyester in a pigmented coating composition imparts easy brushing qualities, a minimum tendency to run, splatter or splash, and quick bodying properties after application, but with long drying time in the tacky stage in the absence of added driers. The polyester is used with other common ingredients including volatile solvent. It may be used with numerous alkyd resins used in the coating industry. By using the polyester as a component of the coating composition liquid, the proportion of it may be varied to secure desired properties in controlled degree.

The polyester as an ingredient in making coating compositions having a drying vehicle has another advantage arising from the presence of catalytic driers for accelerating all the drying stages to the final dry film, and particularly to minimize the period of tackiness. I have discovered that the addition of very small amounts of certain metallic salts of organic acids used as driers, has an immediate thickening action with the polyester when the latter is present in a liquid either with or without pigment. The mere physical combination of the polyester and the effective salt results in an immediate and pronounced increase of viscosity. As examples of such salts, the commercial auxiliary driers which are calcium salts of naphthenic acid and of 2-ethylhexoic acid are highly effective. Calcium salts with other acids are also effective, such as calcium tallate and the calcium salts of rosin acids, like abietic acid. From studies of the activities of metal salts of organic acids, the activity appears to reside in the calcium, rather than the acid radical. Organic salts of calcium are used which are soluble in the vehicle.

The viscosity increase is accompanied by producing thixotropy, which is more pronounced in pigmented compositions. In physically mixing the salt with a liquid, pigmented or not, which contains the polyester, there is a thickening even during the agitation of mixing. When the mixing ceases, the viscosity increases further to a thicker liquid or even to a gel, according to proportions present. But this increase of viscosity on standing is a thixotropic thickening, the viscosity being reduced by agitation. Thus, a coating composition containing the polyester and the calcium salt is one which can become thick or which may gel in a can, yet which can be thinned merely by agitation.

Without the presence of such a thickening combination of salt and polyester, a liquid containing the polyester as an ingredient shows increased viscosity when containing the combination of polyester and pigment. This also is a thixotropic thickening. Although the mechanism is not understood, it is believed to be the result of the formation of small quantities of soluble metallic salt of organic acid, by slight reactivity between pigment and vehicle, giving the same effect as described above in regard to the combination of polyester and calcium salt.

Such coating compositions thinned by agitation may be made to have easy application qualities, and to body rapidly after application sufficiently to minimize running, sagging and beading. In use, such a thixotropic composition, especially as a paint or enamel, maintains its thinness for application by the agitation resulting from constantly dipping the brush, or wetting a roller. In applying the liquid from a brush or roller, the agitation of application keeps it thin. As soon as the agitation stops by removing the applicator, the composition thickens. This thickening results from the thixotropic character, and if volatile solvent is present, of course, the thickening is accelerated on that account.

Aside from the application properties of the compositions, there is a great advantage available in manufacturing the pigmented coating compositions, deriving from the immediate thickening action by incorporating together the polyester and pigment, with or without the calcium salt. Pigments are more easily milled into vehicles, that is with less power consumption, the lower the viscosity of the receiving liquid. Thus, pigment may be milled into a vehicle lacking in polyester, or in a vehicle containing the effective salt, but lacking in polyester, or into a vehicle which contains polyester and lacks the salt. Upon completion of the milling, the product may be appropriately made to contain polyester, without the salt, or both polyester and the salt, and thereby immediately thickened. The resulting composition is thixotropic to the extent controlled by the content of polyester and the nature and amount of the calcium salt.

Practice of the present invention involves first the preparation of the polyester from the fatty acid polymerized to a major portion of its dimer. Then the polyester may be used as an ingredient of a clear coating composition or added to a composition of pigment in vehicle, or it may be used as an ingredient of a liquid vehicle for receiving pigment by conventional milling practice. The thickening salt or drier may be added to function with the polyester at any point in the process where thickening is desired, and this may be before sealing in a can, or afterwards as is sometimes done by the consumer.

In the following description, various oil-modified, alkyd resin formulations have been used, and for identification, their characteristics are given in the following Table I.

TABLE I

*Alkyd resin solutions*

|  | No. 1 | No. 2 | No. 3 | No. 4 | No. 5 |
|---|---|---|---|---|---|
| Percent Solids Content | 49 to 51 | 49 to 51 | 49 to 51 | 49 to 51 | 59 to 61. |
| Solvent (Odorless) | Min. Sp | Min. Sp | Min. Sp | Min. Sp | Min. Spirits. |
| Weight/gal | 7.3 to 7.4 | 7.60 | 7.25 to 7.30 | 7.45 to 7.55 | 7.3 to 7.7. |
| Density | 0.875 to 0.890 | 0.91 | 0.87 to 0.88 | 0.895 to 0.900 | 0.910 to 0.925. |
| Viscosity (G-H) | Z to Z1 | Z1 to Z2 | U to V | S to T | Z to Z2. |
| Color (Gardner) | 9 to 10 | 4 to 6 | 3 to 4 | 8 to 9 | 4 to 7. |
| Acid No | 8 to 12 | 8 to 10 | 6 to 10 | 15 to 20 | 6 to 8. |
| Percent Phthalic Anhydride Content | 15 | 25 | 20 |  | 24. |
| Resin Content |  |  |  | 45 |  |
| Type of Resin |  |  |  | Maleic Rosin Ester Gum. |  |
| Percent Oil Content | 50 | 60 | 60 | 55 | 62. |
| Type of Oil | Soya | Soya | Soya | Maleated Soya | Soya. |
| Rosin | Present |  |  |  |  |

*Production of polyester.*—The polyester is made by a condensation carried out in a manner to reduce the acid number of the reacting mass to a value in the range from 2 to 30. If the acidity indicated by the acid number has a function in the present invention, it is not known, and no theory is presented to account for it.

To indicate the possibility of variations in making the polyester, a fixed procedure has been adopted with respect to which factors have been varied. Table II shows the variable factors in processes designated as Examples A-1 to A-5, according to the following procedure:

The "Empol 1022" and the glycol are heated at 420° F. with 0.25 part of anthraquinone, optionally used for improving color, and refluxed until a first acid number is reached. The reflux condenser is then removed and the material is heated to 520° F. with a slow sparging by bubbles of carbon dioxide gas. This temperature and the sparging are continued for a period of time until the acid number is in the range indicated, and at 77° F. the viscosity of the final mineral spirits solution by the Garden-Holt bubble viscosimeter is in the indicated range. Then the polyester is cooled and dissolved in an equal portion of odorless mineral spirits, which as referred to in this description, is that identified as 26 Kauri-butanol value.

TABLE II

*Polyester process*

[Parts by weight.]

| Example | Empol | Polyhydric Alcohol | First Acid No. | Sparging Time, Hours | Final Acid No. | Final Viscosity (G-H) |
|---|---|---|---|---|---|---|
| A-1 | 900 | 100 Ethylene Glycol | 30 | 5 | 5 to 7 | U to V. |
| A-2 | 890 | 110 Propylene Glycol | 30 | 5 to 6 | 5 to 7 | T to U. |
| A-3 | 860 | 140 1,4 Butylene Glycol | 30 | 4 to 5 | 10 to 12 | Y to Z. |
| A-4 | 895 | 95 Ethylene Glycol, 10 Trimethylolethane. | 35 | 4 | 13 to 15 | Y to Z. |
| A-5 | 915 | 75 Ethylene Glycol, 10 Trimethylolethane. | 45 | 3 to 4 | 30 | V to W. |

The resulting polyester solutions are designated A-1S to A-5S corresponding to the A- examples of Table II. The characteristics of the resulting polyester solutions are given in Table III.

The viscosity of the above under the agitation of the Stormer viscosimeter is 124 Krebs units. On standing without agitation, it develops a false viscosity such that the enamel will barely flow when the can is inverted.

TABLE III

*Characteristics of polyester solution*

|  | Ex. A-1S | Ex. A-2S | Ex. A-3S | Ex. A-4S | Ex. A-5S |
| --- | --- | --- | --- | --- | --- |
| Solids | 50% | 50% | 50% | 50% | 50%. |
| Solvent (26) | Min. Spir. | Min. Spir. | Min. Spir. | Min. Spir. | Min. Spir. |
| Weight/gal | 7.00 to 7.05 | 7.00 to 7.10 | 7.10 to 7.15 | 7.00 to 7.05 | 7.00 to 7.05. |
| Density | 0.84 to 0.85 | 0.84 to 0.85 | 0.850 to 0.855 | 0.84 to 0.85 | 0.85. |
| Viscosity [1] | U to V | T to U | Y to Z | Y to Z | V to W. |
| Solids Acid No | 5 to 7 | 5 to 7 | 10 to 12 | 9 to 10 | 30. |
| Color (Gardner) | 9 to 10 | 9 to 10 | 9 to 10 | 13 to 15 | 9 to 10. |

[1] Gardner-Holt bubble. 1933 standards.

The polyester solutions of Table III are semi-drying liquids, and as such, are not recommended as coating compositions or as the sole liquid vehicle for receiving pigments to form quick drying paints and enamels. However, they may be used as components with other liquid ingredients to form suitable drying vehicles. The preferred companion ingredient is any of the oil-modified alkyd resins which are suitable as ingredients of coating compositions.

To indicate the variability of proportions for using the polyester as an ingredient in a coating composition, the polyester solutions of Table III have been mixed in varying proportions with other ingredients to form coating compositions which may be used also as liquid vehicles for pigments, such coating compositions being identified as B-1 through B-4 in Table IV. In Table IV, the various polyester solutions of Table III are mixed with an alkyd resin of Table I.

TABLE IV

*Coating compositions and mixed vehicles*

| Example | Parts By Weight | |
| --- | --- | --- |
|  | Liquid | Polyester Solution |
| B-1 | 75 Alkyd Resin No. 1 | 25 A-1S. |
| B-2 | 50 Alkyd Resin No. 2 | 50 A-2S. |
| B-3 | 85 Alkyd Resin No. 3 | 15 A-3S. |
| B-4 | 98 Alkyd Resin No. 1 | 2 A-5S. |

The coating compositions of Table IV are clear free-pouring solutions and are excellent vehicles for pigments to form enamels, suitable for various interior and exterior surfaces and for use with brush or roller.

EXAMPLE P-1

The following ingredients are formulated to flat enamel:

Parts by weight
Titanium dioxide _____ 200
30% $TiO_2$.70% $CaSO_4$ _____ 200
Aluminum silicate pigment _____ 200
Diatomaceous earth _____ 100
Anti-settling silicate _____ 3
Vehicle B-1 _____ 308
Mineral spirits (26) _____ 100

Grind above to 7 Hegman units then add:

Mineral Spirits (26) _____ 100
24% lead 2-ethylhexoate [1] _____ 3
6% cobalt 2-ethylhexoate [1] _____ 1
4% calcium naphthenate [1] _____ 5

[1] Where "%" is indicated for metal salt driers in this description, it refers to metal content.

Under agitation, such even as the agitation of brushing, it returns to a viscosity of 124 Krebs units.

EXAMPLE P-2

The same formulation as in Example P-1 is made, using in place of vehicle B-1, the vehicle B-2. The agitated viscosity is 110 Krebs units, and the product likewise thickens on standing, as a result of the thixotropy of the present invention.

EXAMPLE P-3

A brushing semi-luster enamel is formulated as follows:

Parts by weight
Titanium dioxide _____ 55
30% $TiO_2$.70% $CaSO_4$ _____ 461
Talc _____ 80
Alkyd resin No. 5 _____ 300

Grind to 6 Hegman units and add:

Alkyd resin No. 5 _____ 159
24% lead naphthenate _____ 5
6% cobalt naphthenate _____ 2
Mineral spirits (26) _____ 120

The above enamel has a viscosity of 82 Krebs units measure at 25° C. on the Stormer viscosimeter. To the enamel are added 9 parts of polyester solution A-4S. This raises the working viscosity to 100 Kreb units. On standing, the viscosity increases to the extent that it will hold upright and vertical a spatula stuck into it. Upon agitation, the gelled enamel thins to 100 Krebs units.

To the resulting thixotropic enamel are added 0.011 part of a 4% calcium naphthenate solution, resulting immediately in a working viscosity of 120 Krebs. Upon standing, a can of the latter will not flow on inversion, but on agitation it liquifies to 120 Krebs units and may be easily poured from one can to another.

EXAMPLE P-4

A flat lusterless enamel is prepared as follows:

Parts by weight
Titanium dioxide _____ 600
Pigment [1] _____ 100
Diatomaceous earth _____ 20
Mineral spirits (F.P. 140° F.) _____ 100
Alkyd resin No. 1 _____ 244

Grind to 4 Hegman units and add:

Mineral spirits (F.P. 140° F.) _____ 120
24% lead 2-ethylhexoate _____ 3
6% cobalt 2-ethylhexoate _____ 1

[1] A pigment of calcium silicate: 50.9% $SiO_2$ and 46.9% CaO, and trace quantities, none over .55%, of FeO, $Al_2O_3$, MnO, MgO, and $TiO_2$.

The viscosity is 69 Krebs units measured at 25° C. in the Stormer viscosimeter. It runs and drips when applied to vertical surfaces. To it are then added 4 parts of the polyester solution A-4S of Table III, thus raising the working viscosity to 88 Krebs units. On standing, the viscosity increases. It thins again on agitation to 88 Krebs units, and it then brushes easily onto vertical surfaces without running or sagging, because it sets when the agitation of application ceases. When 0.011 part of 4% calcium naphthenate are added, the working viscosity increases to 110 Krebs units, and on standing the composition will not pour from the container. It is again thinned by agitation to a brushing consistency of 110 Krebs units, and can likewise be applied without running and with setting by its thixotropic character.

EXAMPLE B-5 (POLYESTER SOLUTIONS)

The polyester solution A-5S of Table III was diluted to 35% solids with odorless mineral spirits to determine the effect of various salts to increase its viscosity, to bar possible interference of pigment or other liquid. The diluted solution has an original viscosity of K (G.H.). To 50 grams of the solution was added one gram of numerous salts dissolved in mineral spirits, to a metal content indicated in Table V, which gives in some instances the viscosity (G.H.) of the salt solution.

TABLE V

| Salt Solution | | Final Viscosity (G.H.) |
|---|---|---|
| Kind | Viscosity (G.H.) | |
| 5% Calcium Naphthenate | -A | Z2. |
| 5% Calcium 2-Ethylhexoate | C | Z1. |
| 3% Calcium in Limed Rosin Solution | | V. |
| 2-Ethylhexoic Acid | | J. |

The last item in Table V is an organic acid which thins the solution from viscosity K to J, this being but a small change. Such result shows that the metal is the important functioning constituent of the salt.

From the foregoing, it will be understood that the invention is not limited to the specific materials, compositions and procedures given above to illustrate and explain the invention. Many variations and modifications are contemplated as falling within the scope of the appended claims.

I claim:
1. A thixotropic pigmented coating composition comprising a liquid vehicle and pigment, said vehicle comprising essentially volatile solvent and a resinous base of oil-modified alkyd resin, said vehicle comprising as additives a small quantity of a combination of materials which are a polyester and a calcium drier salt of an organic acid which salt is soluble in the vehicle, and which combination imparts to the composition increased thixotropic viscosity, the polyester having an acid number in the range from 2 to 30 and being the condensation product of polyhydric alcohol with a polymerized unsaturated 18-carbon fatty acid containing predominantly the dimer of said fatty acid, said polyhydric alcohol being selected from the group consisting of ethylene glycol, propylene glycol and butylene glycol, and mixtures containing a major proportion of at least one of said glycols with a minor proportion of trimethylolethane.

2. A thixotropic pigmented coating composition according to claim 1 in which the calcium salt is calcium naphthenate.

References Cited in the file of this patent

UNITED STATES PATENTS

| 2,317,668 | Cheetham et al. | Apr. 27, 1943 |
| 2,373,015 | Cowan et al. | Apr. 3, 1945 |

FOREIGN PATENTS

| 428,864 | Great Britain | May 15, 1935 |

OTHER REFERENCES

Cowan et al.: Ind. & Eng. Chem., pp. 148–152, vol. 36, February 1944. (Copy in Scientific Library.)

Moore: Paint, Oil & Chem. Review, Jan. 4, 1951, pp. 13, 14, 16, 26, 28 and 29.